United States Patent
Chen

(10) Patent No.: US 8,306,687 B2
(45) Date of Patent: Nov. 6, 2012

(54) METHOD OF DIAGNOSING A VEHICLE HAVING DIAGNOSTIC DATA

(75) Inventor: Ieon Chen, Laguna Hills, CA (US)

(73) Assignee: Innova Electronics, Inc., Irvince, CA (US)

( * ) Notice: Subject to any disclaimer, the term of this patent is extended or adjusted under 35 U.S.C. 154(b) by 507 days.

(21) Appl. No.: 12/616,080

(22) Filed: Nov. 10, 2009

(65) Prior Publication Data

US 2011/0112932 A1    May 12, 2011

(51) Int. Cl.
*G01F 7/00* (2006.01)

(52) U.S. Cl. ........... 701/31.5; 701/33.2; 701/31.4; 701/33.4; 701/33.3; 701/71; 235/380; 705/27.1; 705/40; 705/400

(58) Field of Classification Search ......... 701/31.4, 701/31.5, 33.2, 33.3, 33.4; 702/183; 705/27.1, 705/40, 400; 713/182, 185; 324/537; 340/442, 340/447; 455/420, 426.1; 235/380
See application file for complete search history.

(56) References Cited

U.S. PATENT DOCUMENTS

| | | |
|---|---|---|
| 2,960,654 A | 11/1960 | Nelson |
| 3,646,438 A | 2/1972 | Staff |
| 4,112,748 A | 9/1978 | Walley |
| 4,176,315 A | 11/1979 | Sunnarborg |
| 4,207,611 A | 6/1980 | Gordon |
| 4,404,639 A | 9/1983 | McGuire et al. |
| 4,684,896 A | 8/1987 | Weishaupt |
| 4,689,573 A | 8/1987 | Hilmer |
| 4,859,932 A | 8/1989 | Whitley |
| 4,884,033 A | 11/1989 | McConchie, Sr. |
| 5,003,478 A | 3/1991 | Kobayashi et al. |
| 5,005,129 A | 4/1991 | Abe et al. |
| 5,032,791 A | 7/1991 | Bates, Jr. |
| 5,107,428 A | 4/1992 | Bethencourt et al. |
| 5,157,708 A | 10/1992 | Garthwaite et al. |
| 5,170,125 A | 12/1992 | Bates, Jr. |
| 5,214,582 A | 5/1993 | Gray |
| 5,247,245 A | 9/1993 | Nelson |
| 5,278,508 A | 1/1994 | Bowman |
| 5,285,163 A | 2/1994 | Liotta |
| 5,359,290 A | 10/1994 | Cervas |
| 5,394,093 A | 2/1995 | Cervas |
| 5,400,018 A | 3/1995 | Scholl et al. |
| 5,442,553 A * | 8/1995 | Parrillo ............ 455/420 |
| 5,481,906 A | 1/1996 | Nagayoshi et al. |
| 5,491,418 A | 2/1996 | Alfaro et al. |
| 5,506,772 A | 4/1996 | Kobozono et al. |
| 5,519,397 A | 5/1996 | Chapotot et al. |
| 5,532,927 A | 7/1996 | Pink et al. |

(Continued)

*Primary Examiner* — Behrang Badii
*Assistant Examiner* — Yuri Kan
(74) *Attorney, Agent, or Firm* — Stetina Brunda Garred & Brucker

(57) ABSTRACT

Provided is a method of diagnosing a vehicle having diagnostic data. The method includes providing an automotive diagnostic tool sold to a user by a selling retailer. The automotive diagnostic tool is configured to download diagnostic data from the vehicle and upload the diagnostic data to a computer. The computer is configured to communicate the diagnostic data to a diagnostic database associated with the selling retailer (such as a private label website) upon establishing a communication link between the automotive diagnostic tool and the computer. A communication link is then established between the automotive diagnostic tool and the computer. In response thereto, a communication link is then established between the computer and the diagnostic database. The diagnostic data is thereafter communicated from the automotive diagnostic tool to the diagnostic database via the computer. The diagnostic database is arranged to map vehicle diagnostic data to a most likely vehicle fix.

28 Claims, 5 Drawing Sheets

U.S. PATENT DOCUMENTS

| | | | |
|---|---|---|---|
| 5,541,840 A | 7/1996 | Gurne et al. | |
| 5,635,841 A | 6/1997 | Taylor | |
| 5,657,233 A | 8/1997 | Cherrington et al. | |
| 5,758,300 A | 5/1998 | Abe | |
| 5,875,413 A | 2/1999 | Vinci | |
| 5,916,286 A * | 6/1999 | Seashore et al. | 701/33.2 |
| 5,935,180 A | 8/1999 | Fieramosca et al. | |
| 5,991,672 A * | 11/1999 | Rendi et al. | 701/71 |
| 6,021,366 A | 2/2000 | Fieramosca et al. | |
| 6,061,638 A | 5/2000 | Joyce | |
| 6,097,998 A | 8/2000 | Lancki | |
| 6,141,608 A | 10/2000 | Rother | |
| 6,225,898 B1 | 5/2001 | Kamiya et al. | |
| 6,263,265 B1 | 7/2001 | Fera | |
| 6,263,268 B1 | 7/2001 | Nathanson | |
| 6,263,322 B1 | 7/2001 | Kirkevold et al. | |
| 6,295,492 B1 | 9/2001 | Lang et al. | |
| 6,314,422 B1 | 11/2001 | Barker et al. | |
| 6,330,499 B1 | 12/2001 | Chou et al. | |
| 6,359,442 B1 | 3/2002 | Henningson et al. | |
| 6,370,454 B1 | 4/2002 | Moore | |
| 6,389,337 B1 | 5/2002 | Kolls | |
| 6,434,455 B1 | 8/2002 | Snow et al. | |
| 6,459,969 B1 | 10/2002 | Bates et al. | |
| 6,535,802 B1 | 3/2003 | Kramer | |
| 6,594,579 B1 | 7/2003 | Lowrey et al. | |
| 6,604,033 B1 | 8/2003 | Banet et al. | |
| 6,611,740 B2 | 8/2003 | Lowrey et al. | |
| 6,636,790 B1 * | 10/2003 | Lightner et al. | 701/31.5 |
| 6,680,675 B1 | 1/2004 | Suzuki | |
| 6,687,584 B2 | 2/2004 | Andreasen | |
| 6,701,233 B2 | 3/2004 | Namaky et al. | |
| 6,718,425 B1 | 4/2004 | Pajokowski et al. | |
| 6,738,696 B2 | 5/2004 | Oi | |
| 6,771,073 B2 | 8/2004 | Henningson et al. | |
| 6,807,469 B2 | 10/2004 | Funkhouser et al. | |
| 6,823,243 B2 | 11/2004 | Chinnadurai et al. | |
| 6,832,141 B2 | 12/2004 | Skeen et al. | |
| 6,845,307 B2 | 1/2005 | Rother | |
| 6,928,349 B1 | 8/2005 | Namaky et al. | |
| 6,940,270 B2 | 9/2005 | Chen | |
| 6,941,203 B2 | 9/2005 | Chen | |
| 6,947,816 B2 | 9/2005 | Chen | |
| 7,012,512 B2 | 3/2006 | St. Denis | |
| 7,073,714 B2 | 7/2006 | Namaky et al. | |
| 7,085,680 B2 | 8/2006 | Huang | |
| 7,225,065 B1 * | 5/2007 | Hunt et al. | 701/33.2 |
| 7,447,574 B1 * | 11/2008 | Washicko et al. | 701/33.4 |
| 7,596,437 B1 * | 9/2009 | Hunt et al. | 701/33.2 |
| 7,672,763 B1 * | 3/2010 | Hunt et al. | 701/33.2 |
| 2001/0053983 A1 | 12/2001 | Reichwein et al. | |
| 2002/0007237 A1 * | 1/2002 | Phung et al. | 701/33 |
| 2002/0016655 A1 | 2/2002 | Joao | |
| 2002/0128985 A1 * | 9/2002 | Greenwald | 705/400 |
| 2002/0156692 A1 | 10/2002 | Squeglia et al. | |
| 2002/0193925 A1 | 12/2002 | Funkhouser et al. | |
| 2003/0060953 A1 | 3/2003 | Chen | |
| 2004/0172177 A1 | 9/2004 | Nagai et al. | |
| 2004/0227523 A1 * | 11/2004 | Namaky | 324/537 |
| 2005/0143882 A1 | 6/2005 | Umezawa | |
| 2005/0159923 A1 * | 7/2005 | Huang | 702/183 |
| 2006/0041348 A1 | 2/2006 | Liebl et al. | |
| 2006/0041349 A1 | 2/2006 | Chinnadurai et al. | |
| 2007/0124040 A1 * | 5/2007 | Chen | 701/33 |
| 2007/0198148 A1 * | 8/2007 | Namaky | 701/29 |
| 2008/0004762 A1 * | 1/2008 | Seashore et al. | 701/29 |
| 2008/0203153 A1 * | 8/2008 | Keithley et al. | 235/380 |
| 2009/0021362 A1 * | 1/2009 | Kochie | 340/442 |
| 2009/0076678 A1 * | 3/2009 | Namaky | 701/33 |
| 2009/0216401 A1 * | 8/2009 | Underdal et al. | 701/35 |
| 2009/0299900 A1 * | 12/2009 | Chen | 705/40 |
| 2009/0300365 A1 * | 12/2009 | Karmes et al. | 713/182 |
| 2010/0066525 A1 * | 3/2010 | Kochie | 340/447 |
| 2010/0205450 A1 * | 8/2010 | Sarnacke et al. | 713/185 |
| 2010/0262335 A1 * | 10/2010 | Brozovich | 701/33 |
| 2010/0273477 A1 * | 10/2010 | Namaky | 455/426.1 |
| 2011/0035095 A1 * | 2/2011 | Chinnadurai et al. | 701/33 |
| 2011/0035096 A1 * | 2/2011 | Liebl et al. | 701/35 |
| 2011/0112932 A1 * | 5/2011 | Chen | 705/27.1 |
| 2011/0125364 A1 * | 5/2011 | Delcroix | 701/33 |
| 2012/0035805 A1 * | 2/2012 | Wempen | 701/33.3 |
| 2012/0053781 A1 * | 3/2012 | Namaky | 701/31.5 |
| 2012/0130583 A1 * | 5/2012 | Bertosa et al. | 701/31.4 |

* cited by examiner

METHOD OF DIAGNOSING A VEHICLE HAVING DIAGNOSTIC DATA

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention is related generally to automotive diagnostics, and more specifically to an automotive diagnostic system capable of integrating an automotive diagnostic tool to a retailer's diagnostic database for analyzing automotive diagnostic data.

Automobiles have evolved over the years from generally simple mechanical devices into relatively complex electro-mechanical systems having several computer components integrated therein. The vehicle's electrical systems may be operated from a central onboard computer. The components may include sensors and digital storage devices for generating and storing data related to the operation of the vehicle (i.e., emissions data, mileage per gallon data, engine temperature data, etc.). In vehicles manufactured recently, a diagnostic trouble code (DTC) may be generated and stored when a particular vehicle component or system is not operating within prescribed operating parameters.

Obtaining data from the vehicle's onboard computer may facilitate diagnosing problems associated with operation of the vehicle. For instance, downloading the DTC from the onboard computer may indicate a particular problem plaguing the vehicle. However, in some instances, additional automotive data may be required to provide a more complete diagnostic analysis. Therefore, diagnostic scan tools have been developed to obtain the DTCs, as well as additional vehicle operational data from the onboard computer for diagnostic purposes. The DTCs and/or additional vehicle operational data will be referred to herein as "diagnostic data."

In order to download the diagnostic data from the vehicle to the automotive diagnostic tool, the tool is connected to the vehicle. After the diagnostic data is downloaded from the vehicle's onboard computer, the diagnostic data may be analyzed to determine a diagnosis. In this regard, the analysis may lead to a potential solution, or most likely solution to the vehicle's problem(s).

There may be a wide range of service providers capable of analyzing the diagnostic data. Consequently, the user may have a plurality of different service providers from which he may choose from. Given the large amount of competition between diagnostic service providers, it is desirable for automotive diagnostic companies to attempt to market their services to consumers who have already purchased the diagnostic tool from one of their retail locations. For instance, many automotive companies sell automotive parts and tools in addition to offering automotive diagnostic and repair services. Therefore, if a consumer has purchased the automotive diagnostic tool from a particular retailer, the customer has already shown a propensity to shop at that automotive company and has established a relationship with that automotive company. As such, that particular automotive company may be advantageously positioned to obtain that customer's business when the customer needs diagnostic analysis services.

Furthermore, once the analysis is complete, the identified potential solution or most likely solution may require parts or repair services. Similar to the plethora of diagnostic data analytic service providers discussed above, there are typically a plurality of companies that offer automotive parts and repair service. Therefore, it may be desirable for the retailer of the automotive diagnostic tool to additionally be positioned to perform automotive diagnostics, and to sell related parts and repair services to customers who have already purchased an automotive diagnostic tool from one of the retailer's locations.

In view of the foregoing, there is a need in the art for an automotive diagnostic system which advantageously positions a retailer of automotive diagnostic tools to provide downstream analysis of automotive diagnostic data, as well as to sell parts and/or repair services to consumers who have purchased the automotive diagnostic tool from a retailer's location.

BRIEF SUMMARY

Provided is a system and/or method which may be employed to expand a retailer's content offerings in an effort to maintain customer loyalty, in addition to generating downstream revenues and sales. The diagnostic system may include a diagnostic database located at a private label website associated with the retailer and accessible by retailer's customers. The customers may upload diagnostic data from their vehicles to the private label website to obtain a diagnostic report for their vehicle. The private label website may offer parts and services to generate revenues for the diagnostic specialist and the retailer.

A method is provided of diagnosing a vehicle having diagnostic data. The method includes providing an automotive diagnostic tool configured to download diagnostic data from the vehicle and upload the diagnostic data to a computer. The automotive diagnostic tool may display source identifying indicia associated with a selling retailer. The method further includes creating a private label website associated with the selling retailer. The private label website may include a diagnostic database arranged to map diagnostic data to a most likely fix. Computer executable instructions are provided to configure the computer to connect with the private label website associated with the selling retailer after the automotive diagnostic tool is connected to the computer. The diagnostic data is then received at the private label website associated with the selling retailer.

The method may additionally include the step of analyzing the diagnostic data to determine the most likely fix. A fee may be collected from the user in exchange for determining the most likely fix.

It is contemplated that the most likely fix may require that the user purchase parts or repair services. As such, the method may include directing the user to the selling retailer's website to purchase the parts and/or services. The diagnostic specialist may charge a fee to the selling retailer for directing the user to the selling retailer's website.

The private label website may also be configured to display a repair video with step-by-step instructions for repairing the most likely fix. The user may be charged a fee by the diagnostic specialist for access to the repair video.

There may also be provided a vehicle diagnostic system for use with a vehicle and a computer having a computer display. The vehicle diagnostic system includes a diagnostic tool associated with a selling retailer and a diagnostic operator. The diagnostic tool is connectible to the vehicle to download diagnostic data therefrom. The diagnostic tool may also be connectible to the computer to upload the diagnostic data thereto. A remote diagnostic database is also provided and is operatively connectable to the computer. The remote diagnostic database is associated with the selling retailer and is accessible at a unique electronic address associated with the selling retailer. The remote diagnostic database includes a plurality of diagnostic solutions associated with respective combinations of diagnostic data. A retailer directory is communicable with the computer and includes a plurality of unique electronic addresses associated with respective ones of the plurality of retailers. Each retailer is associated with respective retailer identifying data. A retailer analyzer is in communication with the retailer director and is configured to identify the respective one of the plurality of unique electronic addresses associated with the selling retailer. A computer configuration device is communicable with the computer and is operative to configure the computer to establish a communication link with the respective one of the plurality of unique electronic addresses associated with the selling retailer upon establishing a communication link between the automotive diagnostic tool and the computer.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Various aspects of the present invention are directed toward an automotive diagnostic system which may be used by retailers of automotive parts and services to analyze diagnostic information retrieved from a customer's vehicle. The automotive diagnostic system may include a diagnostic database accessible through a private label website associated with a particular retailer. The private label website may serve as a diagnostic destination point for the retailer's customers. The private label website may be set up and/or operated by a third party diagnostic specialist and tailored to offer a wide range of diagnostic functionality to the retailer's customers. Usage of the diagnostic system may generate revenues for the retailer, as well as the diagnostic specialist.

Figure 1:
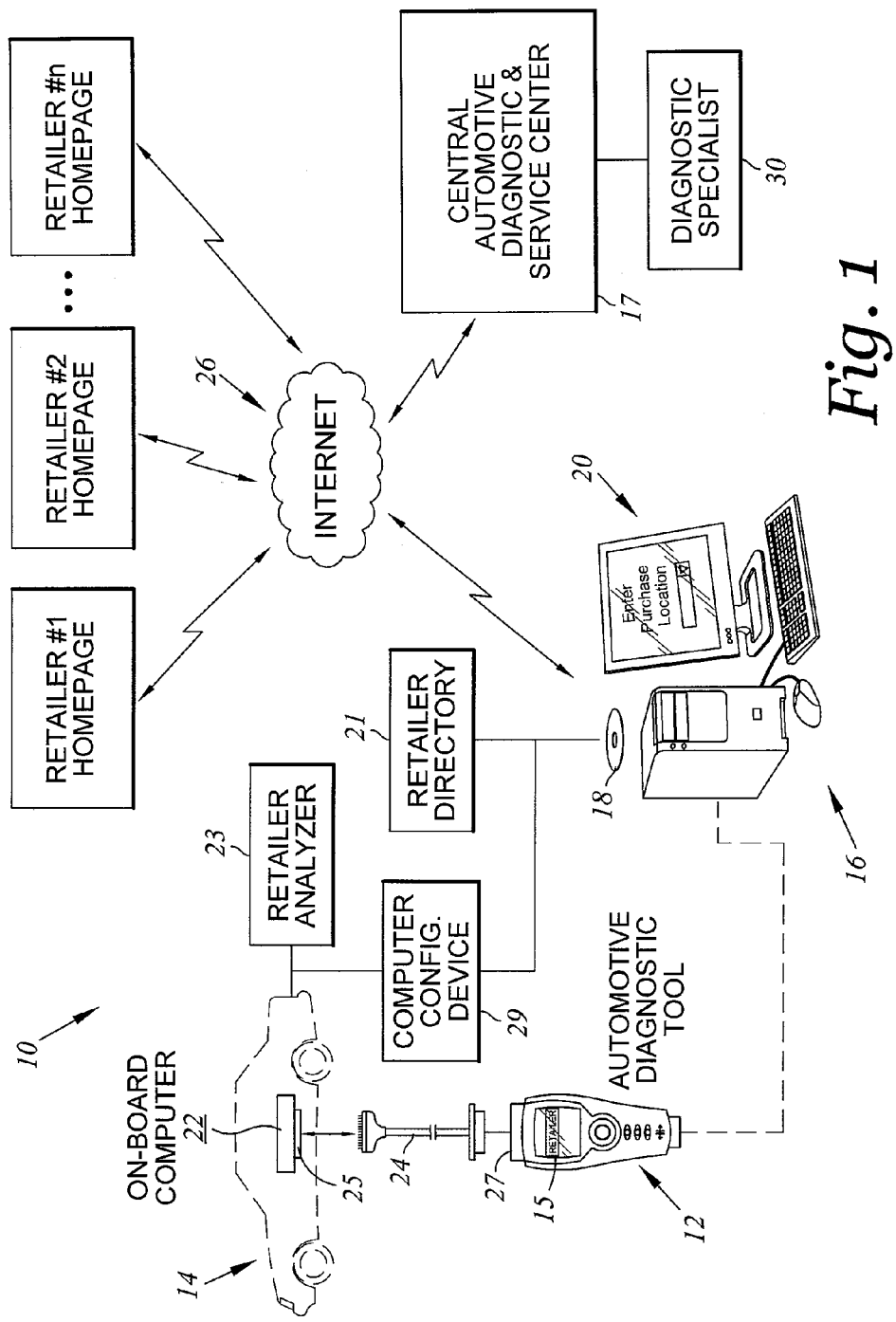
FIG. 1 is a schematic view of an automotive diagnostic system constructed in accordance with an embodiment of the present invention.

Referring now to FIG. 1, there is depicted an automotive diagnostic system 10 constructed in accordance with an embodiment of the present invention. The automotive diagnostic system 10 includes a handheld automotive diagnostic tool 12 which retrieves diagnostic data from a vehicle 14. Most vehicles 14 generate diagnostic data during operation of the vehicle 14. A plurality of automotive sensors may generate the data while monitoring various systems located within the vehicle 14 (i.e., the braking system, engine temperature, emissions, etc.). The vehicle 14 may include a central onboard computer 22 for storing the gathered data, which may include real-time operational data, stored operational data, and/or diagnostic trouble codes (DTC), which may be triggered when certain operational parameters exceed set operational bounds. Such data will be referred to herein as "diagnostic data."

The automotive diagnostic tool 12 may interface with the onboard computer 22 to download the diagnostic data from the onboard computer 22. In this regard, the automotive diagnostic tool 12 may physically interface with the onboard computer 22 or wirelessly interface with the onboard computer 22. As shown in FIG. 1, a connector cable 24 is used to interface the automotive diagnostic tool 12 to the onboard computer 22. The connector cable 24 may engage with a vehicle port 25 located on the vehicle 14 to communicate with the onboard computer 22, and a tool port 27 located on the diagnostic tool 12 to communicate with the diagnostic tool 12.

Once the diagnostic data is downloaded from the onboard computer 22, the data is typically analyzed to determine a solution, or a most likely solution. Given the complexity of the diagnostic data downloaded from vehicle 14, such diagnostic analysis may be performed by a specially configured diagnostic database 17 configured to match the diagnostic data downloaded from the vehicle 14 with potential solutions stored within the diagnostic database to identify a possible solution.

According to one embodiment, the diagnostic database 17 is accessible via a private label website 19 (See FIG. 5) associated with the selling retailer (i.e., the retailer from which the customer purchased the tool 12). The private label website 19 may be accessible via the Internet 26, or other similar data networks. In this regard, the tool 12 may upload the diagnostic data to a computer 16 in order to transfer the diagnostic data to the private label website 19. The tool 12 may be placed in communication with the computer 16 (either wired communication or wireless communication) to upload the diagnostic data to the computer 16.

The tool 12 may include an outer skin having source-identifying indicia 29 associated with the selling retailer. In this manner, the manufacturer of the tool 12 may provide the tool 12 to several retailers, with the tool 12 being customized to display indicia 29 associated with the respective retailer.

When the tool 12 is initially placed in communication with the computer 16, the user may be required to register with the selling retailer. This may entail formatting the computer 16 to communicate with the private label website 19 associated with the selling retailer. The computer 16 may be formatted to connect to the private label website 19 associated with the selling retailer when the tool 12 is connected to the computer 16. The user may be asked to enter data relating to the selling retailer during the initial usage of the diagnostic tool 12. The user may type in the name of the selling retailer, or select the retailer from a list provided to the user (i.e., a drop down menu), as depicted in FIG. 1. The data entered by the user is matched with data in a retailer directory 21 having a plurality of private label website addresses associated with respective retailers. If the user is asked to enter the name of the selling retailer, the retailer directory 21 may be able to identify misspellings or other common names associated with the selling retailer.

In one embodiment, the retailer directory 21 may be stored on a digital storage device 18, such as a CD-ROM, sold and packaged with the tool 12. The user may access the retailer directory 21 after purchasing the tool 12 and inserting the CD-ROM into the computer 16. The CD-ROM may further include a retailer analyzer 23 in communication with the retailer directory 21. The retailer analyzer 23 is configured to identify the private label website address associated with the selling retailer. A computer configuration device 29 may be in communication with the retailer analyzer 23 and disposable in communication with the computer 16. The computer configuration device 29 may be operative to configure the computer 16 to establish a communication link with the private label website associated with the selling retailer upon establishing a communication link between the automotive diagnostic tool 12 and the computer 16.

Although the foregoing describes a CD-ROM including the retailer directory 21, retailer analyzer 23, and computer configuration device 29, it is also contemplated that the retailer directory 21, retailer analyzer 23 and computer configuration device 29 may be accessible via the Internet 26, or other digital storage devices known by those skilled in the art.

Additional measures may be taken to ensure that the computer 16 is configured to communication with the selling retailer's private label website 19, rather than a website associated with another third party retailer. For instance, the diagnostic system 10 may require the user to enter a code which may be printed on a receipt at the time the user purchases the diagnostic tool 12. The code may be associated with the selling retailer, such that entering the code configures the computer 16 to communicate with the selling retailer's private label website 19.

As previously mentioned, the diagnostic database 17 accessible via the private label website 19 may be operated by a diagnostic specialist 30. The diagnostic specialist 30 may enter into an agreement with the selling retailer to set up and/or operate the diagnostic database 17 on the selling retailer's private label website 19. The private label website 19 may be hosted on the selling retailer's main website, or on a website associated with the diagnostic specialist 30. The private label website 19 may include logos, trademarks or other source-identifying indicia associated with the selling retailer. This may give consumers the impression that the selling retailer is providing the diagnostic services. This tends to benefit the selling retailer by expanding their content offerings to the consumer.

Referring now to FIGS. 3-6, once the computer 16 is configured, the diagnostic data may be uploaded to the private label website 19 for diagnostic analysis. The private label website 19 may offer varying levels of diagnostic analysis at varying costs. For instance, a basic translation of the diagnostic data may be offered (See FIG. 3) at no cost to the user, while a more comprehensive diagnostic analysis may be available for a fee (See FIG. 4). One implementation of the more comprehensive diagnostic analysis may include mapping the received diagnostic data with data stored in the diagnostic database 17 to determine a solution, or most likely solution. In this manner, the solution or most likely solution is generally more than a simple translation of the DTCs and may identify specific systems or components which may require repair. The diagnostic database 17 may be arranged to map vehicle diagnostic data to a most likely vehicle fix(es). The most likely vehicle fix(es) may be prioritized in accordance with ranked matches of the received diagnostic data to combinations of diagnostic data stored in a prior experience database. The prior experience database includes an identified fix associated with each stored combination of diagnostic data.

The fix associated with the highest ranked combination of diagnostic data is identified as the most likely fix. The most likely fix may also be mapped to a vehicle repair database, where the most likely fix is directly mapped to an associated repair procedure for repairing the most likely fix. For more information pertaining to more comprehensive diagnostic analysis, please see U.S. patent application Ser. No. 11/823,757, entitled Automotive Diagnostic and Remedial Process, filed on Jun. 28, 2007, owned by Innova Electronics Corp., of Fountain Valley, Calif., the disclosure of which is incorporated herein by reference.

Figure 5:
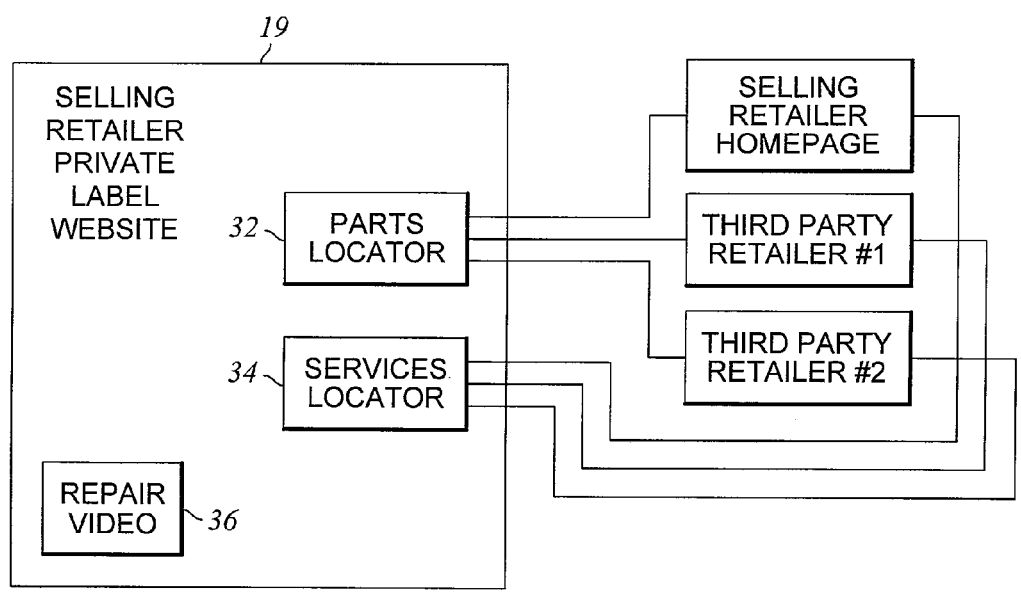
FIG. 5 is a schematic view of the selling retailer's private label website having a parts locator and a services locator in communication with several retailers.

In order to remedy the most likely vehicle fix, the user may be required to replace worn-out parts, or perform other repair or maintenance services on the vehicle 14. Various aspects of the invention may be directed toward assisting the user to obtain the necessary parts and perform the required procedures. Referring now specifically to FIG. 5, if the most likely solution requires the user to purchase automotive parts or services, the private label website 19 may include a parts locator 32 for assisting the user in finding parts, or a services locator 34 for assisting the user in finding a professional capable of performing the service. If the selling retailer is capable of providing the part or service, the user may be directed to the selling retailer's main website to purchase the needed parts or to schedule the required services. In this manner, the user may be directed to the selling retailer's homepage, or to the specific page of the part/service required for the repair. This may allow the selling retailer to avoid competition with other retailers by offering the parts/services at the time the potential solution is identified. This may entice the user to purchase the parts/services, rather than shopping around.

The selling retailer may pay a royalty to the diagnostic specialist for directing the consumer from the private label website to the main website of the selling retailer. The royalty may be a flat rate, or a percentage of the purchase made by the consumer at the selling retailer's main website. In the event the selling retailer is not capable of providing the parts or services, the parts locator 32 and services locator 34 may also identify other third party retailers capable of providing the needed parts or service.

Figure 2:
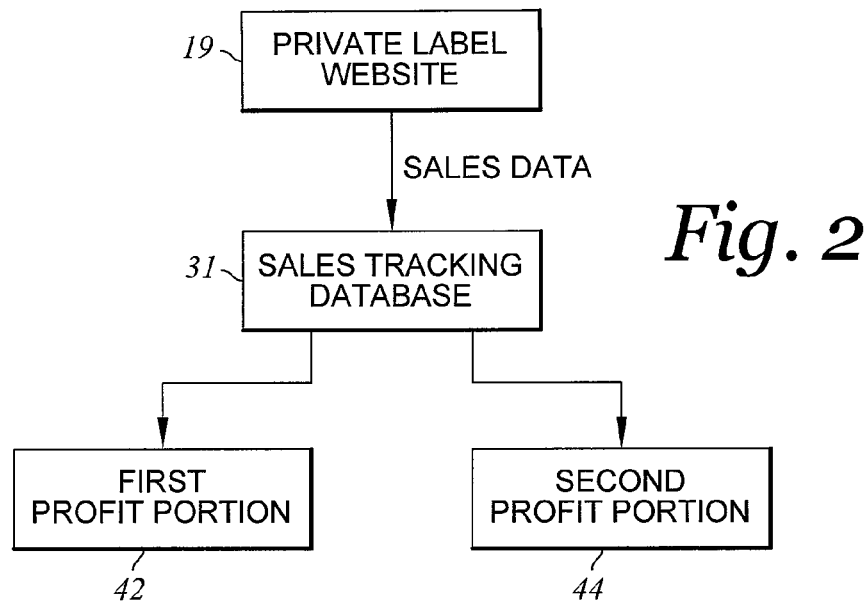
FIG. 2 illustrates a method of tracking sales on a private label website and apportioning profits from those sales.
Figure 3:
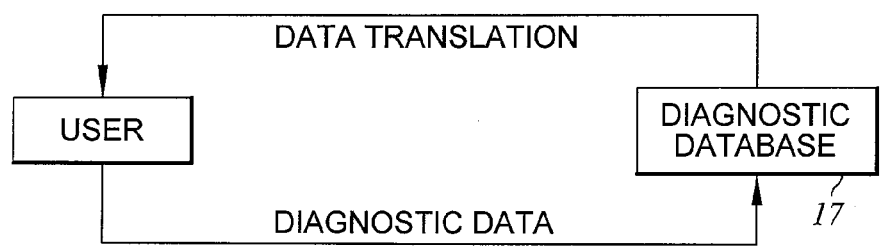
FIG. 3 is a schematic view of a transaction between a user and a diagnostic database.
Figure 4:
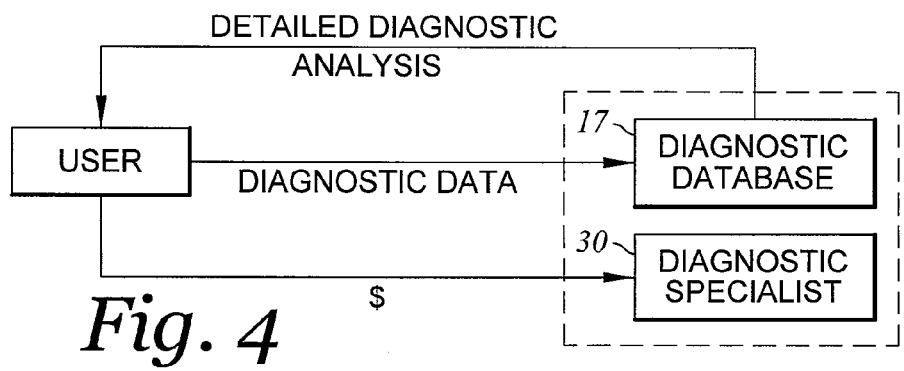
FIG. 4 is a schematic view of a transaction between the user, the diagnostic database and the diagnostic specialist.

The selling retailer and diagnostic specialist may also agree to sell parts directly on the private label website 19. This may simplify the process for the consumer. As shown in FIG. 2, the selling retailer and diagnostic specialist may track sales made on the private label website, on sales tracking database 31, and profits are separated into first profit portion 42 (for the selling retailer) and second profit portion 44, for third party (e.g. the diagnostic specialist, where the the selling retailer pays the diagnostic specialist a royalty for parts or services sold on the private label website, and keeps the remaining profit for sales of parts and services.

It is also contemplated that the private label website 19 may provide instructions to the user for performing the repairs associated with the most likely fix. In one embodiment, the private label website 19 enables access to a video 36 of the repair procedure associated with the most likely fix (referred to herein as the "repair video"). The repair video 36 may provide step-by-step instructions for guiding the user through the repair. The diagnostic specialist 30 may charge the user a fee for access to the repair video 36. The video 36 may be configured to allow a limited number of downloads to enable the user to download the video 36 to a mobile device, such as a laptop, PDA, cell phone, or other mobile device to provide access to the video in a remote location (such as in a garage during the car repair). The private label website 19 may also provide written instructions, which the user may print out or download.

The selling retailer may further entice the user by offering additional discounts or rebates on the private label website 19. The discounts or rebates may be printed out and redeemed later during an in-store purchase at one of the selling retailer's locations. Therefore, the diagnostic system 10 may keep consumers coming back to the selling retailer, rather than losing consumers to third party retailers. The diagnostic specialist 30 may also earn a royalty when the consumer redeems the coupon or rebate. The royalty may be a flat rate, or a percentage of the overall purchase made by the consumer.

Figure 6:
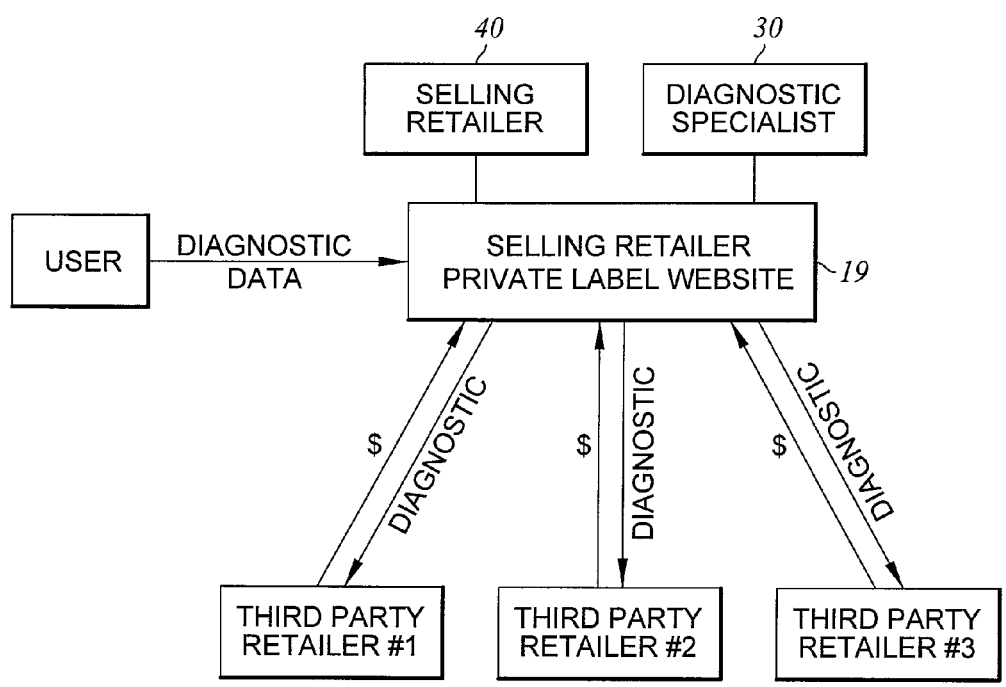
FIG. 6 is a schematic view of a transaction between the user, the selling retailer and several third party retailers.

Referring now to FIG. 6, the selling retailer 40 and/or the diagnostic specialist 30 may generate additional revenues by allowing third party retailers to supply the necessary parts or services. The private label website 19 may communicate the consumer's diagnosis to several third party retailers. The consumer's diagnosis may identify the most likely fix with the vehicle, as well as the parts and repair procedures required to remedy the problem. If the third party retailer is interested in performing the repair and/or selling the parts to the user, the third party retailer may pay an upfront fee to the selling retailer 40 and/or the diagnostic specialist 30 in exchange for the user's contact information. The interested third party retailers may then contact the user to offer their parts and/or repair services. Alternatively, the private label website 19 may simply direct the consumer to a third party website offering the necessary parts or services. The retailer associated with the third party website may pay a fee to the selling retailer 40 and/or the diagnostic specialist 30 for referring the consumer to their website. It is also contemplated that the private label website 19 may simply list third party vendors capable of supplying the parts or performing the services. Such third party vendors may pay the selling retailer 40 and/or the diagnostic specialist 30 for the advertising.

There may be several third party retailers from which the selling retailer may solicit interest from. Therefore, several criteria known by those skilled in the art may be used to direct the user to a third party retailer offering the needed parts or services. For instance, the user may enter his zip code to find the closest third party retailer which offers the parts or services.

In addition to the foregoing, the diagnostic specialist 30 may operate a call center for fielding telephone calls from users of the diagnostic system 10. If users have questions related to operation of the private label website, the personnel at the call center may provide assistance for navigating the private label website. It is also contemplated that users may have mechanical questions. Therefore, the call center may include personnel with mechanical backgrounds to assist users with such mechanical questions. The diagnostic specialist 30 may charge a fee to the users for mechanical advice and assistance.

It is also contemplated that the diagnostic specialist 30 may set up and operate a private label website 19 for more than one selling retailer. Therefore, each private label website 19 may be individually tailored as desired by the respective selling retailer. In other words, each private label website 19 may include the logos, trademarks, and other indicia associated with the respective selling retailer. The diagnostic functionality and options available on each private label website may also be tailored as desired by the respective selling retailer. As such, each private label website 19 may be different from other private label websites 19 operated by the diagnostic specialist 30.

Figure 7:
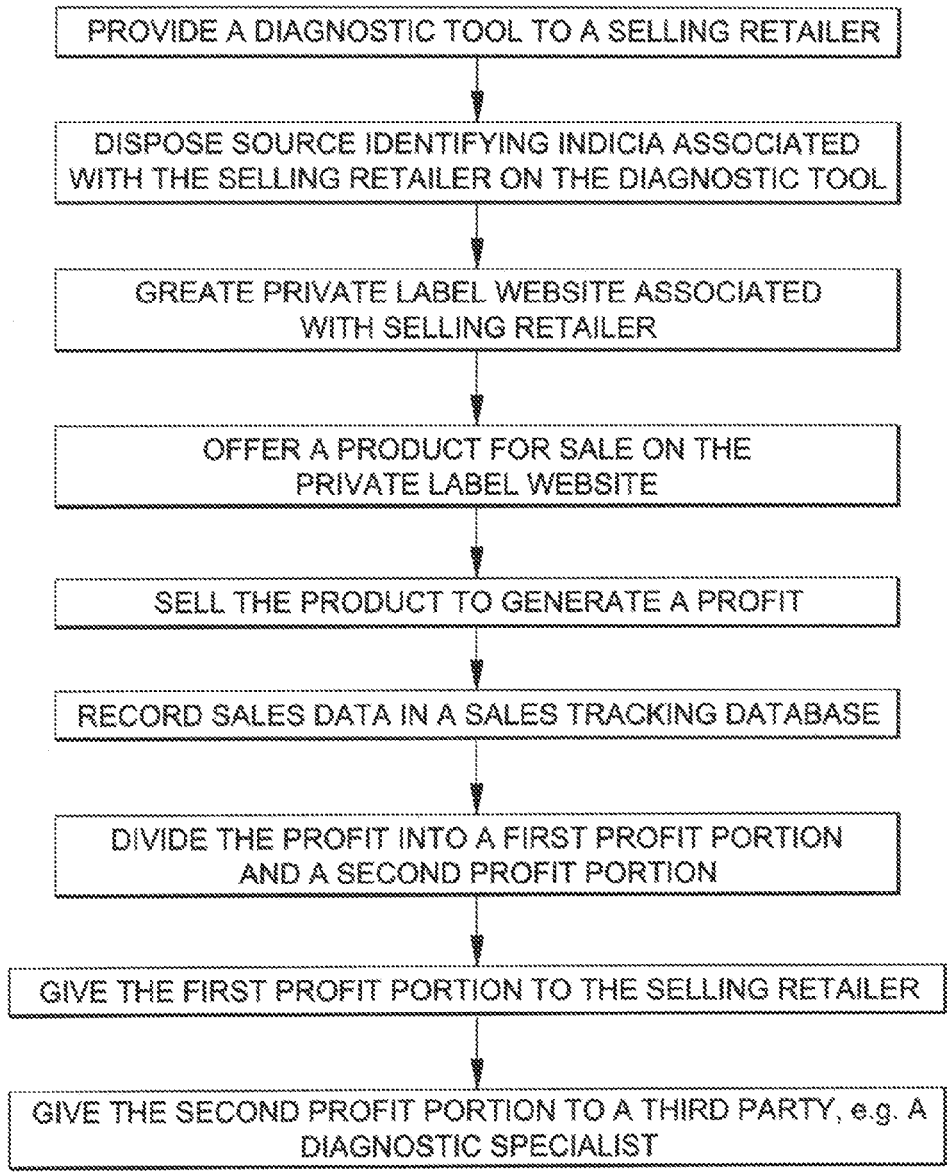
FIG. 7 is a flow chart of one embodiment of a diagnostic method.

Referring now to FIG. 7, one embodiment of a sales generating and sales tracking method includes providing an automotive diagnostic tool to a selling retailer and disposing source identifying indicia associated with the selling retailer on the automotive diagnostic tool. A private label website associated with the selling retailer is created, with the private label website offering a product for sale. The method proceeds by generating a sale of the product via the private label website, the sale creating a profit; recording sales data in a sales tracking database in response to generating the sale; dividing the profit into a first portion and a second profit portion; and giving the first portion to selling the retailer.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of diagnosing a vehicle having diagnostic data, the method comprising the steps of:
   (a) providing an automotive diagnostic tool to a selling retailer, the tool being configured to download diagnostic data from the vehicle and upload the diagnostic data to a computer;
   (b) displaying source identifying indicia on the automotive diagnostic tool, the source identifying indicia being specifically associated with the selling retailer of the automotive diagnostic tool;
   (c) creating a private label website associated with the selling retailer, the private label website having a diagnostic database arranged to map diagnostic data to a most likely fix correlated to the diagnostic data, the private label website being associated with a unique retailer homepage;
   (d) providing computer executable instructions for configuring the computer to navigate to the unique retailer homepage associated with the private label website after the automotive diagnostic tool is connected to the computer, the computer remotely communicating diagnostic data to the private label website associated with the selling retailer; and
   (e) receiving diagnostic data from the computer to the private label website associated with the selling retailer.

2. The method recited in claim 1, further comprising the step of:
   analyzing the diagnostic data to determine the most likely fix; and
   communicating the most likely fix from the private label website to a user of the computer.

3. The method recited in claim 2, further comprising the steps of:
   displaying a link to a second website associated with the selling retailer, the link being displayed on the private label website associated with the selling retailer, the link being configured to establish communication between the second website associated with the selling retailer and the computer; and
   collecting a fee from the selling retailer in response to establishing communication between the second website associated with the selling retailer and the computer.

4. The method recited in claim 1, further comprising the step of:

analyzing the diagnostic data to determine the most likely fix; and communicating a video with instructions for performing the most likely fix from the private label website.

5. The method recited in claim 4, further comprising the step of collecting a fee from the user in response to displaying the video.

6. The method recited in claim 1, further comprising the step of:

analyzing the diagnostic data to determine a most likely fix;

communicating the most likely vehicle fix to a third party retailer.

7. The method recited in claim 1, wherein step (c) includes:

establishing a communication link between the computer and a retailer directory, the retailer directory being arranged to map retailer data entered by a user to the private label website associated with the selling retailer; and analyzing the retailer data to identify the private label website associated with the selling retailer.

8. The method recited in claim 7, further comprising the step of configuring the computer to display a drop-down list to allow the user to select the selling retailer from the drop-down list.

9. The method recited in claim 7, further comprising the step of configuring the computer to display a user input prompt to allow the user to enter an alpha-numeric code associated with the retailer into the computer.

10. A method of diagnosing a vehicle having diagnostic data, the method comprising the steps of:

(a) providing an automotive diagnostic tool to a selling retailer, the tool being configured to download diagnostic data from the vehicle and upload the diagnostic data to a computer;

(b) creating a private label website associated with the selling retailer, the private label website having a diagnostic database arranged to map diagnostic data to a most likely fix correlated to the diagnostic data, the private label website being associated with a unique retailer homepage;

(c) providing computer executable instructions for configuring the computer to navigate to the unique retailer homepage associated with the private label website after the automotive diagnostic tool is connected to the computer, the computer remotely communicating diagnostic data to the private label website associated with the selling retailer;

(d) receiving diagnostic data from the computer to the private label website associated with the selling retailer.

11. The method recited in claim 10, further comprising the step of:

analyzing the diagnostic data to determine the most likely fix; and communicating the most likely fix from the private label website to a user of the computer.

12. The method recited in claim 11, further comprising the steps of:

displaying a link to a second website associated with the selling retailer, the link being displayed on the private label website associated with the selling retailer, the link being configured to establish communication between the second website associated with the selling retailer and the computer; and collecting a fee from the selling retailer in response to establishing communication between the second website associated with the selling retailer and the computer.

13. The method recited in claim 10, further comprising the step of:

analyzing the diagnostic data to determine the most likely fix; and displaying a video with instructions for performing the most likely fix.

14. The method recited in claim 13, further comprising the step of collecting a fee from the user in response to displaying the video.

15. The method recited in claim 10, further comprising the step of:

analyzing the diagnostic data to determine a most likely fix;

communicating the most likely vehicle fix to a third party retailer.

16. The method recited in claim 11, wherein step (b) includes:

establishing a communication link between the computer and a retailer directory, the retailer directory being arranged to map retailer data entered by a user to the private label website associated with selling retailer; and analyzing the retailer data to identify the private label website associated with the selling retailer.

17. The method recited in claim 16, further comprising the step of configuring the computer to display a drop-down list to allow the user to select the selling retailer from the drop-down list.

18. The method recited in claim 16, further comprising the step of configuring the computer to display a user input prompt to allow the user to enter an alpha-numeric code associated with the retailer into the computer.

19. The method recited in claim 2, further comprising the step of collecting a fee from the user.

20. The method recited in claim 6, further comprising the steps of:

receiving a payment from the third party retailer; and communicating user contact data to the third party retailer.

21. The method recited in claim 11, further comprising the step of collecting a fee from the user in response to communicating the most likely fix.

22. The method recited in claim 15, further comprising the steps of:

receiving a payment from the third party retailer; and communicating user contact data to the third party retailer.

23. The method recited in claim 1, wherein step (a) occurs before steps (b)-(e).

24. The method recited in claim 11, wherein step (a) occurs before steps (b)-(d).

25. The method recited in claim 1, further comprising the step of selectively configuring the website in response to receipt of seller identifying information at the website.

26. The method recited in claim 1, further comprising the step of selectively configuring the tool in response to receipt of seller identifying information at the computer.

27. The method recited in claim 1, further comprising the step of selectively configuring the computer in response to receipt of seller identifying information at the computer.

28. The method recited in claim 1, further comprising the step of mapping the diagnostic data to the most likely fix correlated to the diagnostic data of the vehicle.

* * * * *